(12) United States Patent
Owen

(10) Patent No.: US 7,049,921 B2
(45) Date of Patent: May 23, 2006

(54) AUTO-TRANSFORMER FOR USE WITH MULTIPLE PULSE RECTIFIERS

(76) Inventor: Donald W. Owen, 5410 Onset Bay Dr., Rowlett, TX (US) 75089

( * ) Notice: Subject to any disclaimer, the term of this patent is extended or adjusted under 35 U.S.C. 154(b) by 77 days.

(21) Appl. No.: 10/916,139

(22) Filed: Aug. 11, 2004

(65) Prior Publication Data

US 2005/0035838 A1    Feb. 17, 2005

Related U.S. Application Data

(60) Provisional application No. 60/494,475, filed on Aug. 12, 2003.

(51) Int. Cl.
*H01F 30/12* (2006.01)
*H02J 3/00* (2006.01)

(52) U.S. Cl. .............. 336/5; 307/13; 307/17; 363/126

(58) Field of Classification Search ............ None
See application file for complete search history.

(56) References Cited

U.S. PATENT DOCUMENTS

| | | | | |
|---|---|---|---|---|
| 4,013,942 A | * | 3/1977 | Boshnyaga et al. | 323/215 |
| 5,079,499 A | * | 1/1992 | Owen | 323/361 |
| 5,130,628 A | * | 7/1992 | Owen | 318/780 |
| 6,198,647 B1 | * | 3/2001 | Zhou et al. | 363/154 |
| 6,861,936 B1 | * | 3/2005 | Kamath | 336/148 |

* cited by examiner

*Primary Examiner*—Anh Mai
(74) *Attorney, Agent, or Firm*—Eustace P. Isidore; Dillon & Yudell LLP

(57) ABSTRACT

Zig-zag connected, phase shifting, auto-transformers that provides the inherent ability to block the flow of zero sequence currents that are associated with multiple-pulse rectifiers. The transformer coils are wound in three separate, multi-wound windings on three single-phase cores. A vector oriented winding scheme is provided with three output windings and three internal zig-zag configured pairs of windings. The three internal zig-zag windings are connected at corresponding ends of a first winding to form an electrical neutral. The second windings of the three internal zig-zag windings respectively tap one of the output windings. The external power source connects to a point along each of the second windings of the pair of internal windings.

20 Claims, 8 Drawing Sheets

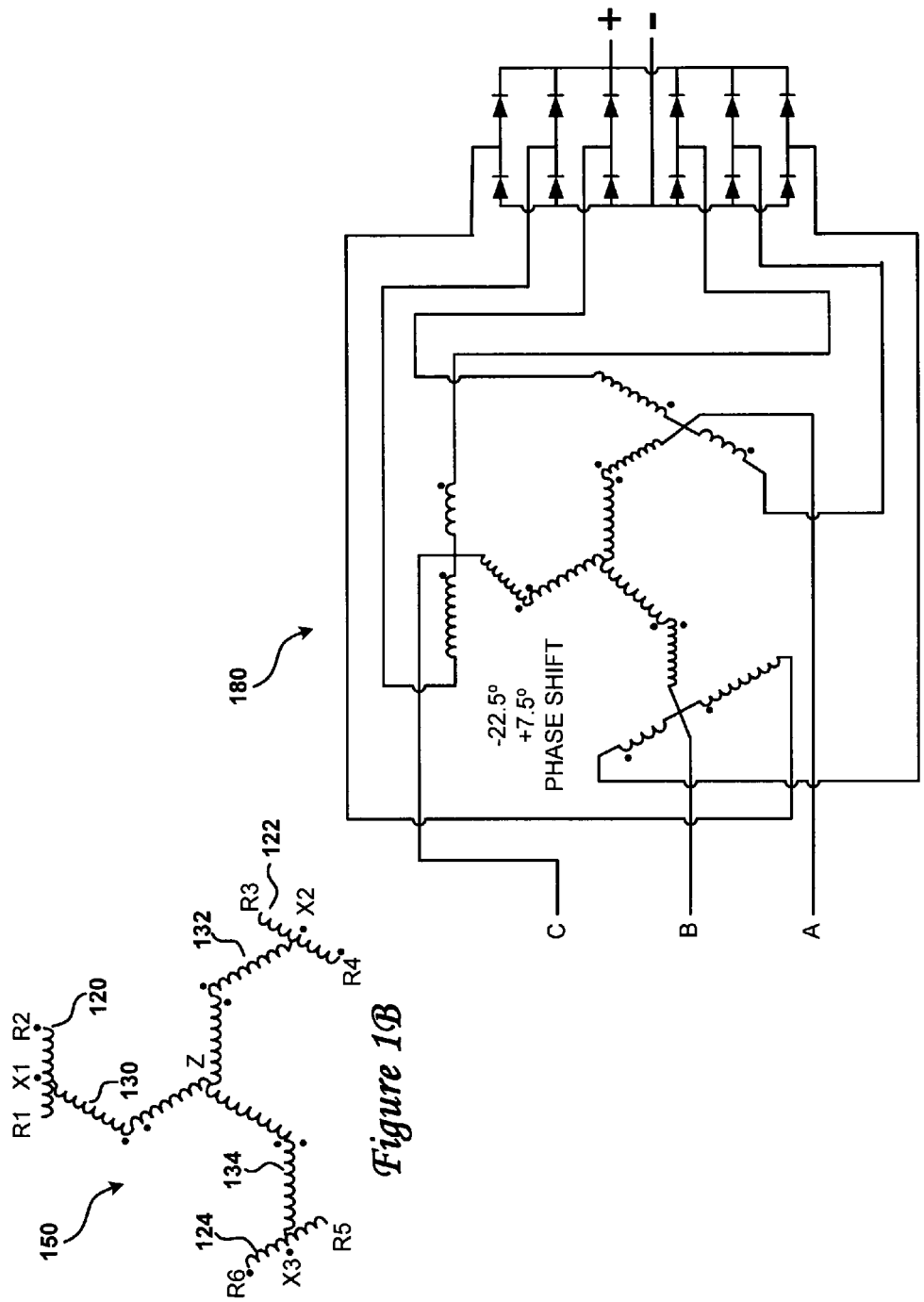

AUTO-TRANSFORMER FOR USE WITH MULTIPLE PULSE RECTIFIERS

PRIORITY CLAIM

The present invention claims the benefit of the filing date of U.S. Provisional Patent Application Ser. No. 60/494,475, filed on Aug. 12, 2003.

BACKGROUND OF THE INVENTION

1. Technical Field

This invention relates generally to transformers and in particular to auto-transformers for phase shifting. Still more particularly, the present invention relates to auto-transformer for use with multiple pulse rectifiers.

2. Description of the Related Art

The operation, design, and functionality of basic auto-transformers are generally known in the art. For example, it is well known in the art that auto transformers can transform electric energy using less mass of conductor and core than equivalent isolation transformers.

One major limitation with auto-transformers is that they typically do not block the flow of unwanted, zero sequence currents, particularly when the auto-transformers are utilized with multiple pulse rectifier applications. With conventional auto-transformers, blocking these unwanted zero sequence currents requires the utilization of additional components, such as inter-phase transformers or zero sequence blocking transformers. These additional components necessarily add to the overall cost of the system. The above limitation of auto-transformers is clearly described in *Power Electronic Converter Harmonics* authored by Derek Paice (I.E.E.E., 1999).

Clearly, the industry would receive a significant benefit if an auto-transformer was designed that was not burdened with the above limitations and that did not require utilization of additional components for blocking these zero sequence currents.

SUMMARY OF THE INVENTION

Disclosed is a plurality of designs of zig-zag connected, phase shifting, auto-transformers that provides the inherent ability to block the flow of zero sequence currents that are associated with multiple-pulse rectifiers. The transformer coils are wound in three separate, multi-wound windings on three single-phase cores. A vector oriented winding scheme is provided with three output windings and three internal zig-zag configured pairs of windings.

The three internal zig-zag windings are connected at corresponding ends of a first winding to form an electrical neutral. In one embodiment, the opposing end of each of the second windings of the internal zig-zag windings is respectively connected to the tap of one of the output windings. In some of the embodiments, the external power source is also connected to the tap of the output windings, so that a respective end of the second winding of the internal zig-zag windings is also connect to the external power source. In other embodiments, the external power source connects to other points along each of the second windings of the pair of internal windings, and the second windings tap the corresponding output windings at a point other than the end of the second winding.

The three output windings have a first and second end point. Each set of three corresponding endpoints represent output points to one half of the twelve-pulse rectifier. In one implementation, these end points are utilized as inputs to another level of auto-transformers to enable 24-pulse rectification.

The above as well as additional objectives, features, and advantages of the present invention will become apparent in the following detailed written description.

BRIEF DESCRIPTION OF DRAWINGS

The novel features believed characteristic of the invention will be set forth in claims: The invention itself however, as well as a preferred mode of use, further objects and advantages thereof, will best be understood by reference to the following detailed description of an illustrative embodiment when read in conjunction with the accompanying drawings, wherein:

FIG. 1B is a schematic of the zig-zag configuration of transformer windings that make up the essence of the auto-transformer of FIG. 1A according to one embodiment of the invention;

FIG. 1C is a schematic of an auto-transformer with asymmetrical phase shifts according to one embodiment of the present invention.

DETAILED DESCRIPTION OF ILLUSTRATIVE EMBODIMENT(S)

Figure 1A:
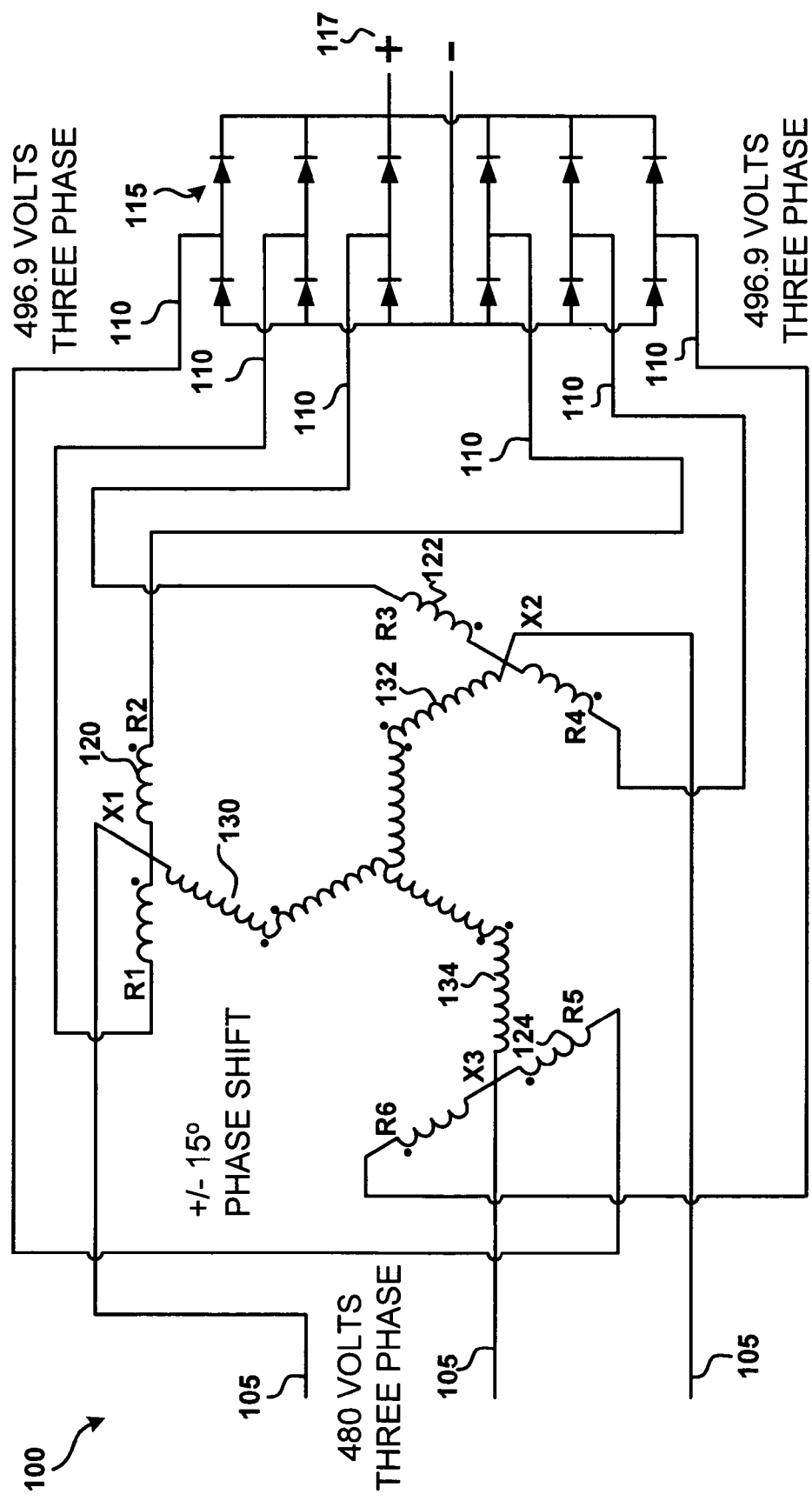
FIG. 1A illustrates a first zig-zag connected, phase-shifting auto-transformer connected to a twelve-pulse rectifier according to one implementation of the present invention.

The invention presents a series of novel designs for zig-zag connected auto-transformers exhibiting the inherent ability to block the flow of zero sequence currents associated with multiple-pulse rectifiers. Various embodiments of the actual auto-transformer designs are illustrated in FIGS. 1A, 1C through 7. However, the functionality of these transformers are made possible through the wiring configuration provided by the coil circuits of FIG. 1B, which provides a zig-zag configuration of coil circuit components, as described below.

The invention provides a phase shifting auto-transformer designed with inherent ability to block the flow of zero sequence currents associated with twelve pulse rectifiers such as utilized in variable frequency drives. The transformer coils are wound in three separate, multi-wound coils on three single-phase cores. In alternate embodiments, the transformer coils are wound on a four-leg or a five-leg, three-phase core. Notably, the invention does not provide a three-leg, three-phase core because the zero sequence blocking voltage is in phase in all three coils and a three-leg core does not have a closed magnetic path to complete the zero sequence magnetic circuit.

A general overview of the invention as provided within the appending claims follows. The transformer of the invention generally includes at least three input terminals arranged for electrical connection to a three phase power source and at least six output terminals arranged for electrical connection to an external multiple phase load. Additionally, the transformer comprises a first coil, a second coil and a third coil, each containing at least a first isolated winding, a second isolated winding and a third isolated winding. Each isolated winding has at least a first end and a second end, and each of the third windings is tapped at corresponding points.

The first ends of the first windings of the first, second and third coils are electrically connected together to form an electrical neutral. The second winding of the first coil is electrically connected to the tap of the third winding of the second coil. The second winding of the second coil is electrically connected to the tap of the third winding of the third coil. Likewise, the second winding of the third coil is electrically connected to the tap of the third winding of the first coil.

Additionally, the second end of the first winding of the first coil is electrically connected to the second end of the second winding of the second coil, the second end of the first winding of the second coil is electrically connected to the second end of the second winding of the third coil, and the second end of the first winding of the third coil is electrically connected to the second end of the second winding of the first coil.

Each of the three first ends of the third windings is connected to a separate one of the at least six output terminals, and each of the three second ends of the third windings is connected to a separate one of the remaining output terminals.

In one embodiment, the transformer is constructed using single phase cores, while in another embodiment the transformer is constructed using a five legged three phase core. Irrespective of the particular core type being utilized, the first end of the second winding of the first coil is electrically connected to the tap of the third winding of the second coil. The first end of the second winding of the second coil is electrically connected to the tap of the third winding of the third coil, and the first end of the second winding of the third coil is electrically connected to the tap of the third winding of the first coil.

Several alternate embodiments are provided for connecting the three input terminals to the transformer windings. In a first embodiment, the tap of each the third winding is electrically connected to a separate one of the at least three input terminals. In a second embodiment, the second windings are tapped at corresponding points, and each tap of the second windings is connected to a separate one of the at least three input terminals. With this second embodiment also, the first end of the second winding of the first coil is electrically connected to the tap of the third winding of the second coil, the first end of the second winding of the second coil is electrically connected to the tap of the third winding of the third coil, and the first end of the second winding of the third coil is electrically connected to the tap of the third winding of the first coil.

In a third embodiment in which the second windings are also tapped at corresponding points, the tap of the second winding of the first coil is electrically connected to the tap of the third winding of the second coil, the tap of the second winding of the second coil is electrically connected to the tap of the third winding of the third coil, and the tap of the second winding of the third coil is electrically connected to the tap of the third winding of the first coil. With this configuration, each of the first ends of the second windings is electrically connected to a separate one of the at least three input terminals.

Referring now to FIG. 1B, a vector oriented winding schematic 150 is illustrated with various endpoints (representing the input and output points for each pair of windings) indicated by numbered letters Xn and Rn, respectively. Three output windings 120, 122, 124 and three internal zig-zag configured pairs of windings 130, 132, 134 are provided.

The three output windings each have a first and second end point, labeled even to odd numbered subscript of R (i.e., R1–R2, R3–R4, and R5–R6). The three internal zig-zag pairs 130, 132, 134 are connected at corresponding ends of a first winding to form an electrical neutral Z. The opposing end of the second winding of each of the three internal pairs of windings 130, 132, 134 are respectively connected to a tap on one of the output windings 120, 122, 124. In this illustration (made clearer in FIG. 1A), the tap of each of the output windings 130, 132, 134 is also the point of contact (X1, X2, and X3) for respective ones of the input terminals.

X1, X2, and X3 represents the point of contact for the three-phase input voltage to the particular transformer, and the location changes with the specific design of the transformer(s) illustrated. Each of the six windings (i.e., the three internal pairs of windings) connected in a zig-zag pattern between X1, X2, and X3 carry currents appropriate to match the effective ampere turns flowing in the windings terminated at R1 through R6. Also, together, the six zigzag connected windings are designed to operate at the voltage applied to input points X1, X2, and X3. In the base designs of auto-transformers (FIGS. 1A, 1C, 2 and 3), R1, R3, and R5 (corresponding first endpoints) represent output points to one half of the twelve-pulse rectifier, and R2, R4, R6 (corresponding second endpoints) represent output points to the other half of the twelve-pulse rectifier. Another set of auto-transformer designs (FIGS. 4, 5, 6 and 7) utilize these endpoints as inputs to another level of auto-transformers to enable 24-pulse rectification. An additional configuration is also contemplated in which the transformer is utilized for 18-pulse rectification.

With the windings generally configured according to the above described embodiment, the phase angle displacement between R1–R3–R5 and R2–R4–R6, when designed for a twelve-pulse rectifier, is approximately 30°. The equivalent kVA size of the transformer designed with these parameters and the above windings is approximately one-fourth of an isolation-transformer that yields the same output power.

Turning now to the illustrations of actual auto-transformers connected to respective rectifier circuits, there are depicted several variations of the configuration of internal coils/windings generally similar to the above described configuration. FIG. 1A displays the wiring schematic of a zig-zag connected, phase-shifting auto-transformer 100 connected to a twelve-pulse rectifier 115. As illustrated, each of the three output windings 120, 122, 124 (i.e., R1→R2, R3→R4 and R5→R6) carries the current associated with the six wires 110 connected to the twelve pulse rectifier 115, and each of those windings 120, 122, 124 are designed for the voltage and phase relationship required by the rectifier 115. Further, each of the output windings 120, 122, 124 is tapped by the end of the second winding of one of the internal windings 130, 132, 134.

Each input terminal of a three phase input power source (or input voltage) 105 is connected to the windings at respective input points X1, X2, and X3. In the illustrative embodiment, input voltage of 480 Volts is applied. Output voltage terminals 117 extending beyond the 12-pulse rectifier 115 enable attachment of a load to transformer 100. Within auto-transformer 100, the no-load output voltage 117 is approximately 3.5% higher than the power system voltage (input voltage 105). The 3.5% increase in output voltage falls within the delta of expected and acceptable rectifier operating limits.

Since the first four transformers are similarly configured (with auto-transformer 100, 170, 200, 300 having input windings connected to respective twelve-pulse rectifiers 115, 215, 315), the specific description of the configuration of the other three figures (i.e., FIGS. 1C, 2 and 3) are not given detailed discussion except for specific features and functionality that are different from FIG. 1. Thus, FIG. 2 displays a wiring schematic of a similar, zig-zag connected, phase-shifting auto-transformer as that of FIG. 1. However, unlike FIG. 1, the input terminals are not connected at the tap of the output windings 220, 222, 224 (which also corresponds to the ends of the second windings of the internal winding pairs). Rather the input wires (205) tap corresponding ones of the second windings of the internal winding pairs 230, 232, 234. With this configuration, the no-load output voltage 217 is actually made higher than the voltage of the input power source 205. This embodiment is useful where the rectifier is designed for a certain rated voltage, such as 600 volts, and the power system available at the installation location is lower, such as 480 volts. Thus, as shown by the illustrative embodiment, a voltage increase is provided from 480V up to 600V. The specific change in voltage (480V to 600V) is provided solely for illustrative purposes and not meant to be limiting on the invention. Thus, other voltage changes can be accommodated utilizing the auto-transformer configuration of FIG. 2.

Figure 2:
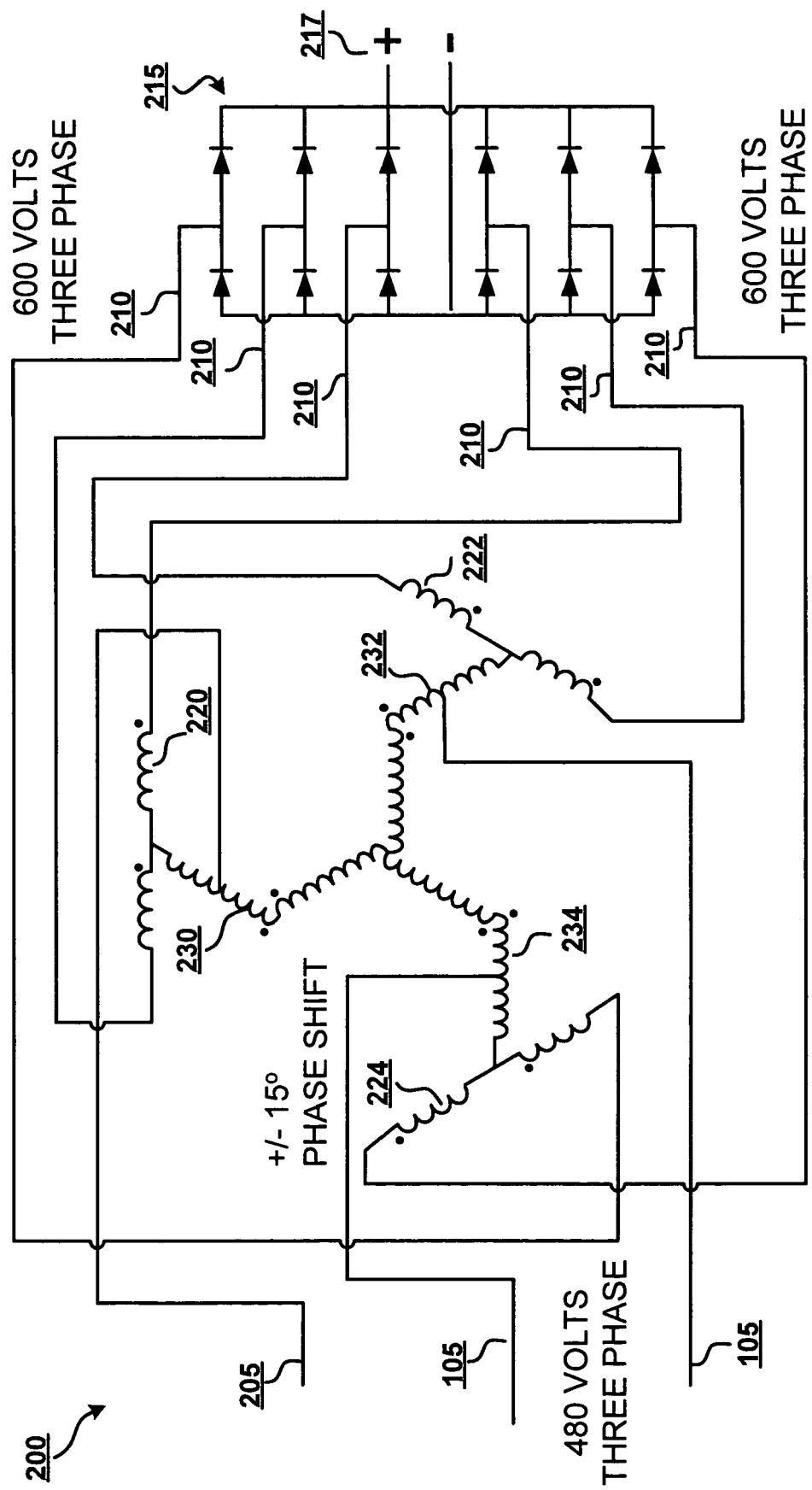
FIG. 2 illustrates a second zig-zag connected, phase-shifting auto-transformer connected to a twelve-pulse rectifier, where the no-load output voltage is higher than the power system voltage according to another embodiment of the present invention.
Figure 3:
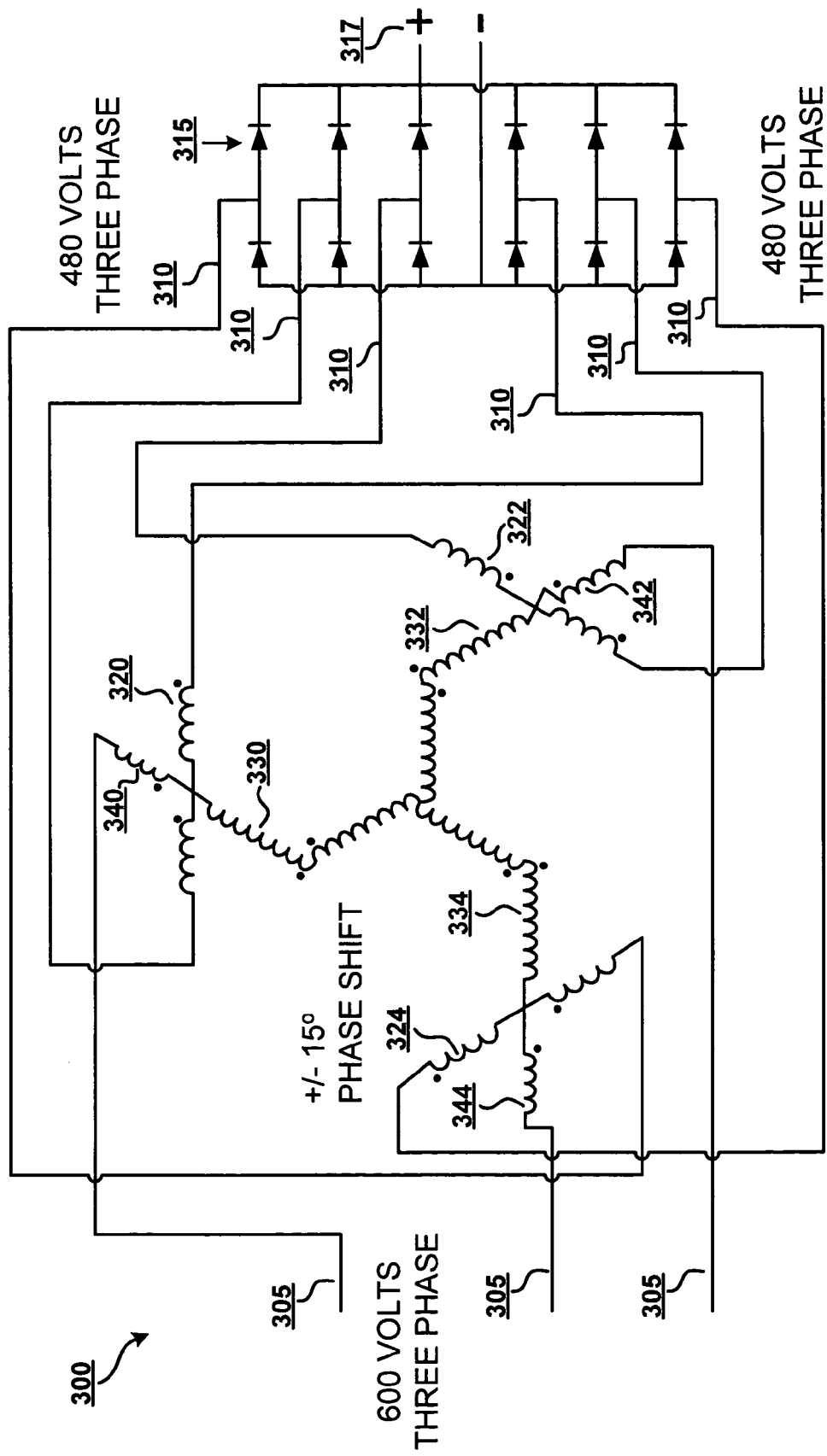
FIG. 3 illustrates a third zig-zag connected, phase-shifting auto-transformer connected to a twelve-pulse rectifier, where the no-load output voltage is lower than the power system voltage according to another embodiment of the present invention.

FIG. 3 also displays wiring schematic of a zig-zag connected phase-shifting auto-transformer 300 with input windings connected to a twelve-pulse rectifier 315 as in FIG. 1 and FIG. 2. However, auto-transformer 300 of FIG. 3 is distinguishable for the previous two transformers because the second winding of each of the internal winding pairs 330, 332, 334 is itself extended beyond the tap of the corresponding output windings 320, 322, 324 so that each second winding is itself tapped by the corresponding output winding 320, 322, 324.

In an alternate embodiment, additional coils (or windings) 340, 342, 244 are coupled to the tap of the output windings 320, 322, 324 and the end of the second windings (of the internal winding pairs 330, 332, 334) at a first end and then to the input terminals 305 (X1, X2, X3) at the next end. These additional windings 340, 342, 344 each has a single winding and the windings 340, 342, 344 are juxtaposed across from the internal pairs of winding 330, 332, 334 relative to the output winding 320, 322, 324.

With the taps on the second winding of the internal winding pairs (or the additional windings) in the above configuration, the no-load output voltage 317 is lower than the voltage of the input power applied at the input terminals 305. This embodiment is useful where the rectifier is designed for a certain rated voltage, such as 480 volts, and the power system available at the installation location is higher, such as 600 volts. The illustrative embodiment indicates a voltage change from 600V down to 480V. Again, this change is presented solely for illustrative purposes, and other voltage changes may be accommodated utilizing variations of the circuit of FIG. 3.

Each of the above illustrated and described zig-zag connected, phase shifting, auto transformers comprises one or more sets of three output phases that are time delayed relative to the input and other sets of three output phases that are time advanced relative to the input. However, some twelve pulse rectifier applications require that one set of outputs has a different amount of time difference (phase shift) relative to the input when compared with the other output. For example, an auto-transformer may be required that exhibits asymmetrical phase shifts of 7.5° for one of the outputs relative to the input while the other output is shifted 22.5° in the opposite direction.

FIG. 1C illustrates wiring schematics of an auto-transformer 150, which exhibits these asymmetrical phase shifts. The direction (delay or advance of the output) depends on the phase sequence (A–B–C or A–C–B) of the input. When the input phase sequence is reversed (i.e., changed form A–B–C to A–C–B), the output that was shifted 7.5° in one direction will then be shifted 7.5° in the opposite direction. Additionally, the output that was shifted 22.5° in one direction will then be shifted 22.5° in the opposite direction (or −22.5°). This asymmetrical shifting allows multiple twelve-pulse rectifiers to be arranged to appear to the power system as a twenty-four-pulse load.

Figure 4:
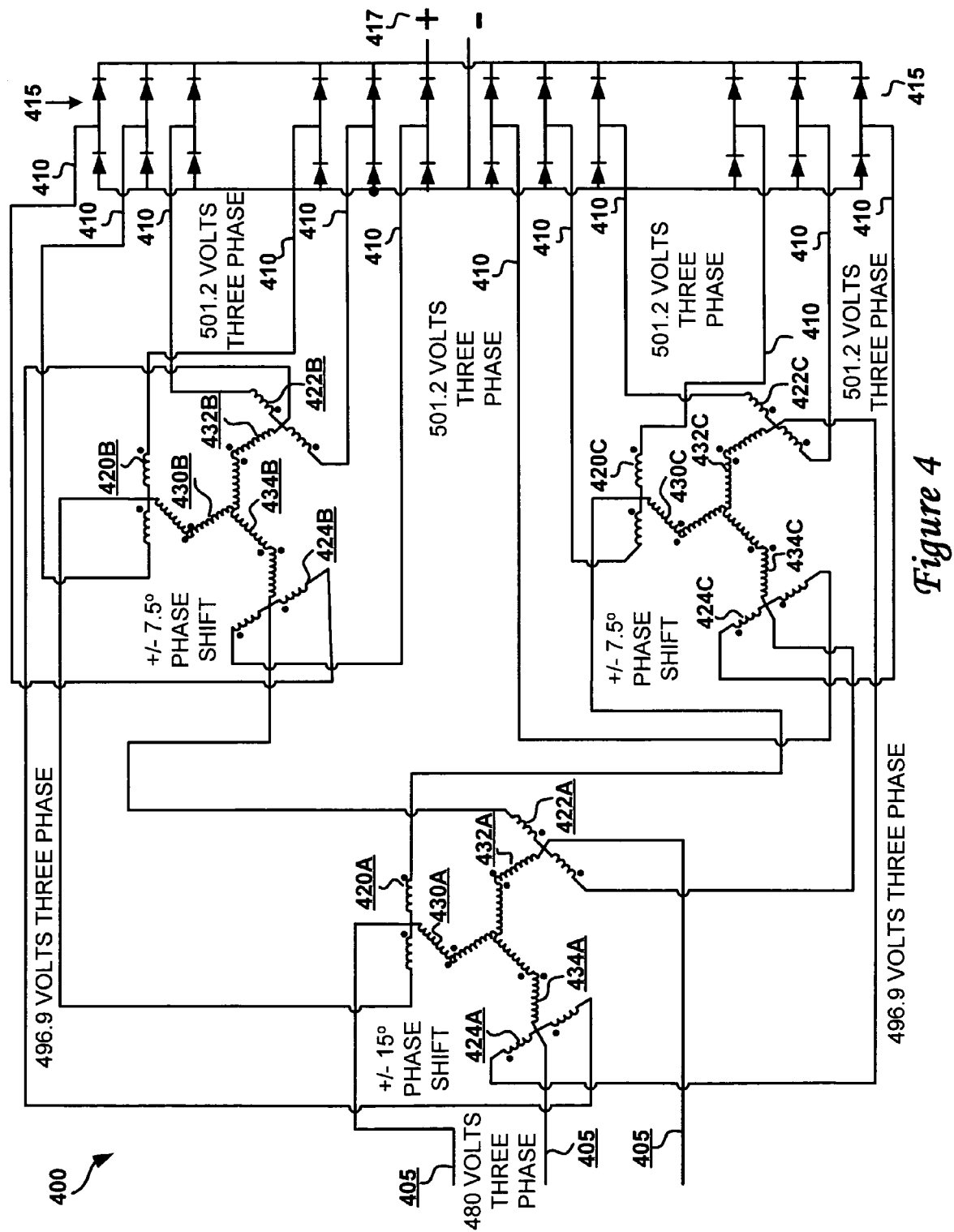
FIG. 4 is a schematic illustrating multiple levels of connected auto-transformers designed similarly to FIG. 1, which enable connection to a twenty-four-pulse rectifier according to one embodiment of the present invention.
Figure 5:
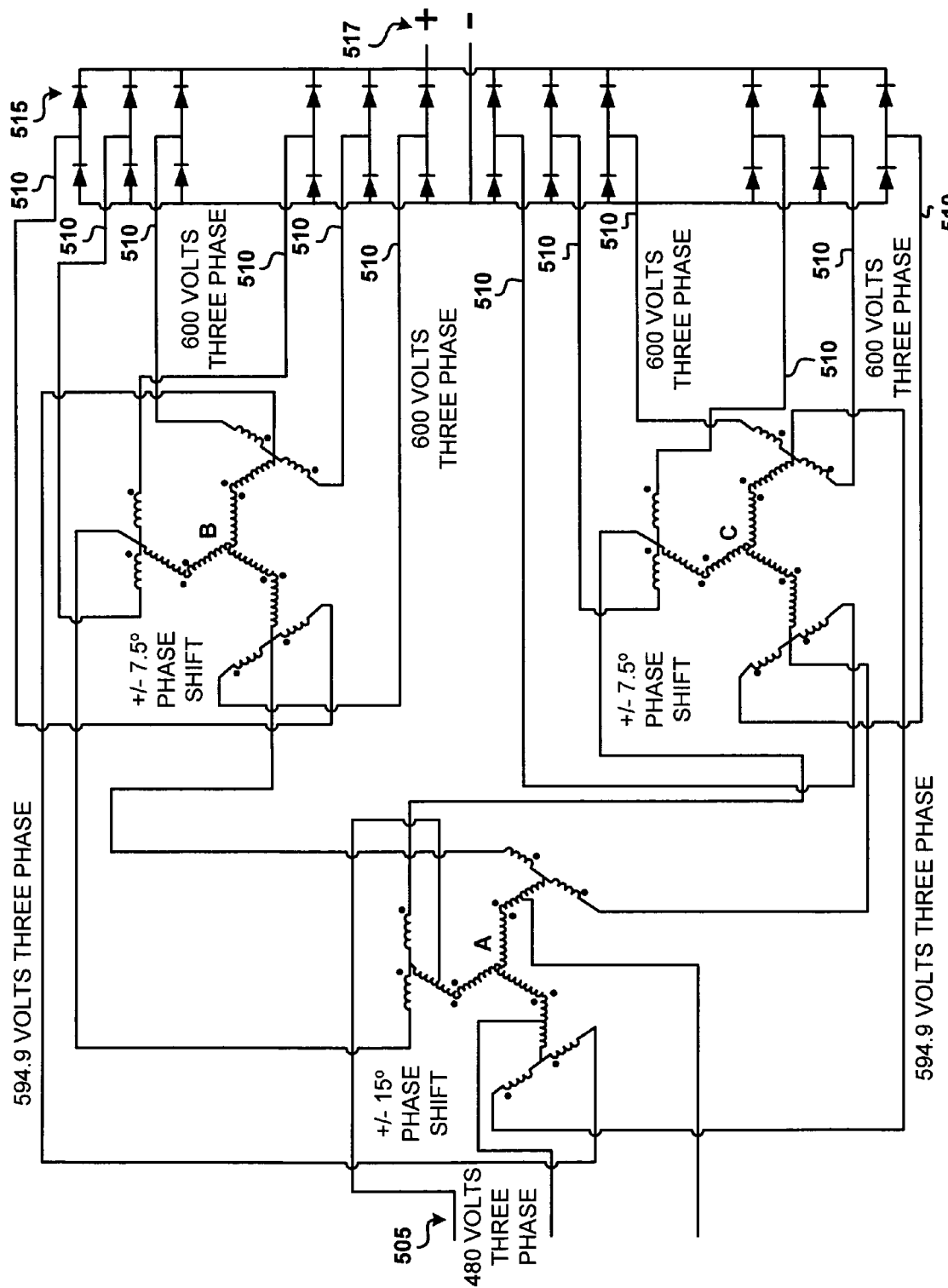
FIG. 5 is a schematic illustrating multiple levels of connected auto-transformers designed similarly to FIG. 2, which enable connection to a twenty-four-pulse rectifier, where the no-load output voltage is higher than the power system voltage according to another embodiment of the present invention.
Figure 6:
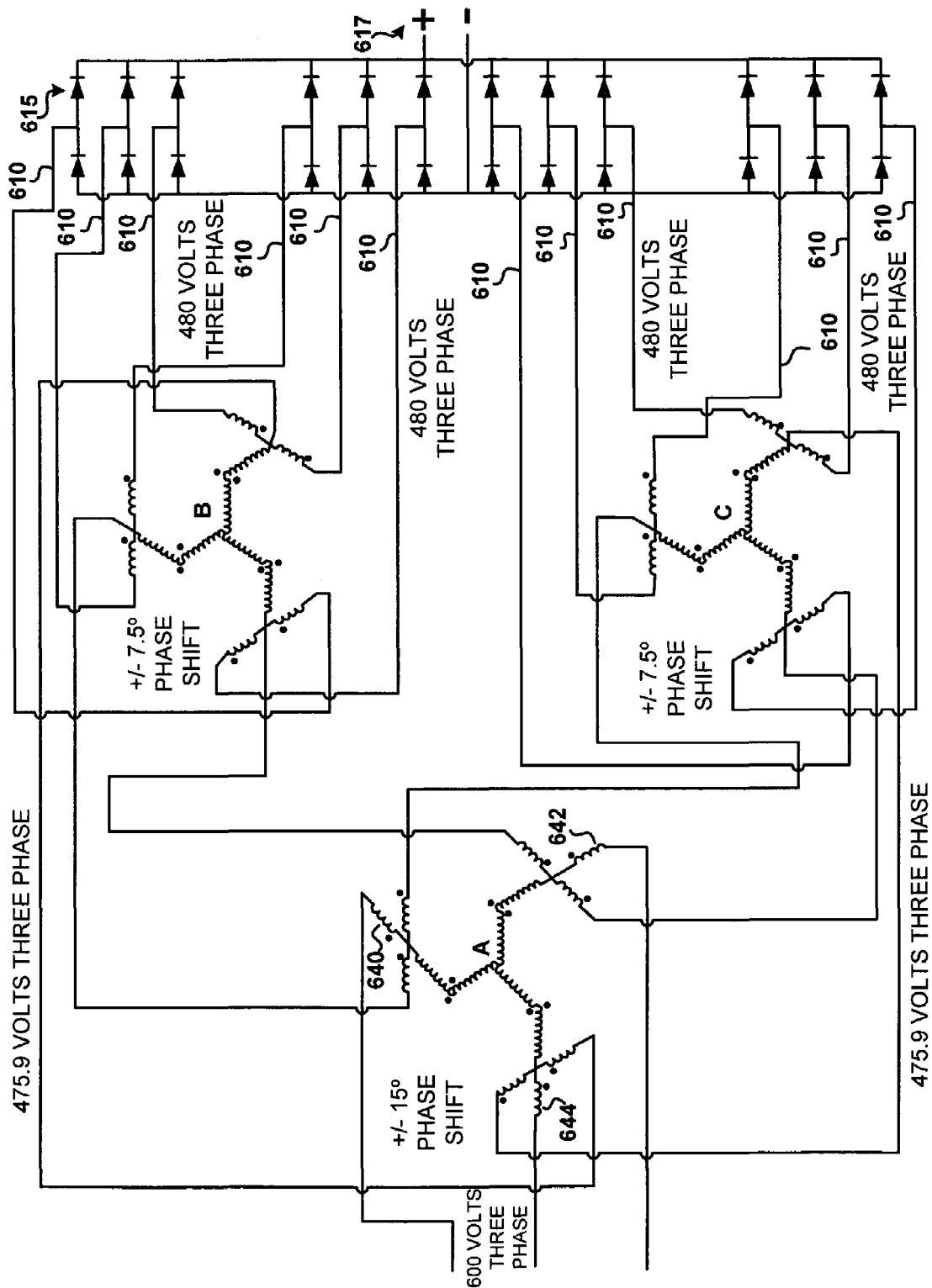
FIG. 6 is a schematic illustrating multiple levels of connected auto-transformers designed similarly to FIG. 1, which enable connection to a twenty-four-pulse rectifier, where the no-load output voltage is lower than the power system voltage, according to another embodiment of the present invention.

FIGS. 4–7 provided a multi-level configuration in which a first level comprises one of the above three described auto-transformers and a second level comprises two somewhat similarly configured auto-transformers. The output connectors/wires of the auto-transformer at the first level serve as the two pairs of three phase inputs for respective ones of the two auto-transformers at the second level. For purposes of the invention, the term "level" refers solely to the output of one auto-transformer serving as the input of another transformer, regardless of the actual physical configuration of the overall transformer system. With these configurations, however, the illustrated transformer system is able to support 24-pulse rectification rather than a 12-pulse rectification with a single level configuration. Each of FIGS. 4, 5, and 6, are substantially multi-level extensions of the auto-transformer illustrated by FIGS. 1A, 2, and 3, respectively. The first level auto-transformer is labeled A, while the two auto-transformers at the second level are labeled B and C, respectively. The use of these alpha-labels indicates that the configurations of the auto-transformers are substantially similar and thus share similar numeric labels (e.g., 420A on first level auto-transformer, and 420B, 420C on respective second level auto-transformers).

FIG. 4 thus displays a multi-level configuration of zig-zag connected, phase-shifting auto-transformers connected to a twenty-four-pulse rectifier 415 to yield an output 417. Each of the corresponding ends of the output windings 420A, 422A, 424A of the first level auto-transformer is coupled to the input wires of one of the second level auto-transformers, which connects at corresponding input points X1, X2, X3. Input voltage 405 is connected to level one auto-transformer similarly as in FIG. 1A. With the configuration of FIG. 4, the no-load output voltage 417 is approximately 4.5% higher than the voltage of the input power system 405. As with auto-transformer of FIG. 1, the present voltage boost is expected and falls within acceptable rectifier operating limits.

FIG. 5 also displays wiring schematic of a set of zig-zag connected, phase-shifting auto-transformers connected to a twenty-four pulse rectifier 515. Notably, only the second winding of the internal windings of the first level auto-transformer are tapped by the input terminals as in auto-transformer 200 of FIG. 2. However, similarly to auto-transformer 200 of FIG. 2, the no-load output voltage 517 from auto-transformers 500 is higher than the input voltage of the power source 505. As one example, a voltage change from 480 up to 600 is provided.

FIG. 6 displays wiring schematic of multi-level zig-zag connected, phase-shifting auto-transformers connected to a twenty-four-pulse rectifier 615. Similar to auto-transformer 300 of FIG. 3, additional windings 640, 642, 644 with single winding are provided (or the second winding is tapped, as described above) at the first level auto-transformer. Also, the configuration results in a lower no-load output voltage 617 than the voltage from the input power source 605. A voltage change from 600 down to 480 is shown, but other voltage changes can be accommodated using the circuit of FIG. 6.

Figure 7:
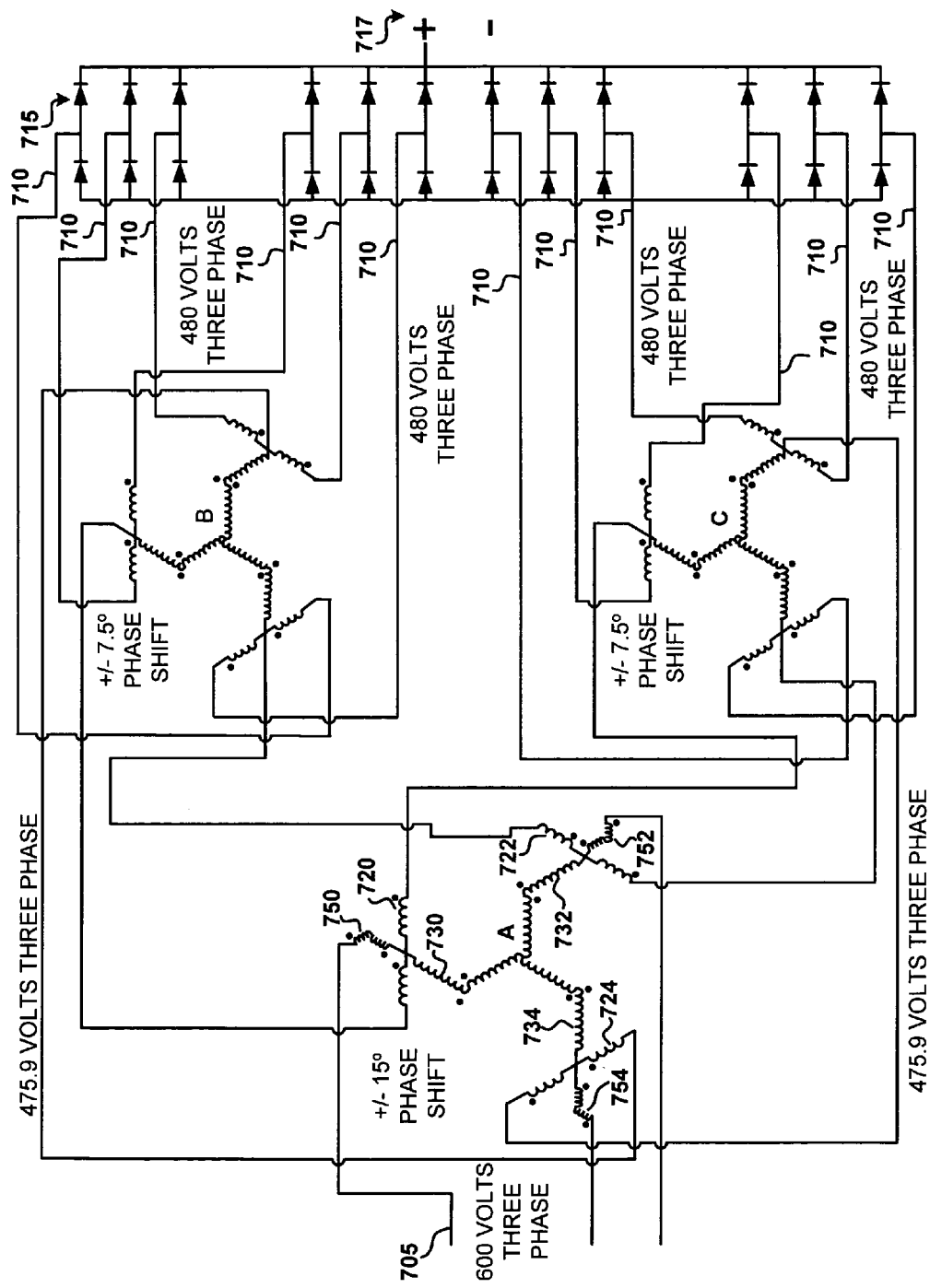
FIG. 7 illustrates an alternate design and connection of multiple levels of auto-transformers that exhibits substantially similar input-to-output voltage and current characteristics as the auto-transformers of FIG. 6.

FIG. 7 illustrates an alternate configuration/design of the multi-level auto-transformers shown by FIG. 6. Rather than a single winding on the additional winding 740, 742, 744, auto-transformer of FIG. 7 includes additional windings 740, 742, 744, each with paired, zig-zag, windings 740, 742, 744 connected between the tap of respective output windings 720, 722, 724 and the corresponding input terminals. This configuration also provides the voltage change exhibited by auto-transformer 600.

The invention presents an auto transformer wiring scheme that overcomes the problem of zero-sequence currents. The invention solves the problems inherent in present auto-transformer implementations, which typically do not work with rectifiers of twelve or more pulse configuration because they do not block the flow of unwanted, zero sequence currents without additional components such as inter-phase transformers or zero sequence blocking transformers.

Industry-wide benefits are possible from the implementation of the newly designed auto-transformers. Primary among these benefits is the substantial elimination of zero sequence currents associated with conventional multi-pulse rectifiers while reducing the weight and manufacturing costs associated with isolation transformers, without adding zero sequence blocking components. Additional benefits may be obvious to those skilled in the art.

While the invention has been particularly shown and described with reference to a preferred embodiment, it will be understood by those skilled in the art that various changes in form and detail may be made therein without departing from the spirit and scope of the invention.

What is claimed is:

1. A transformer comprising:
   at least three input terminals arranged for electrical connection to a three phase power source;
   at least six output terminals arranged for electrical connection to an external multiple phase load; and
   a first coil, a second coil and a third coil each containing at least a first winding, a second winding and a third winding, each winding being isolated relative to each other and having a first end and a second end, wherein:
   each of said third windings is tapped at corresponding points;
   the first ends of the first windings are electrically connected together to form an electrical neutral;
   said second winding of said first coil is electrically connected to the tap of said third winding of said second coil;
   said second winding of said second coil is electrically connected to the tap of said third winding of said third coil; and
   said second winding of said third coil is electrically connected to the tap of said third winding of said first coil;
   the second end of said first winding of said first coil is electrically connected to said second end of said second winding of said second coil;
   the second end of said first winding of said second coil is electrically connected to said second end of said second winding of said third coil;
   the second end of said first winding of said third coil is electrically connected to said second end of said second winding of said first coil;
   each of the three first ends of said third windings is connected to a separate one of said at least six output terminals; and
   each of the three second ends of said third windings is connected to a separate one of the remaining output terminals.

2. The transformer of claim 1, wherein said transformer is constructed using single phase cores.

3. The transformer of claim 1, wherein said transformer is constructed using a five legged three phase core.

4. The transformer of claim 1, wherein:
   said first end of said second winding of said first coil is electrically connected to the tap of said third winding of said second coil;
   said first end of said second winding of said second coil is electrically connected to the tap of said third winding of said third coil; and
   said first end of said second winding of said third coil is electrically connected to the tap of said third winding of said first coil.

5. The transformer of claim 1, wherein the tap of each said third winding is electrically connected to a separate one of said at least three input terminals.

6. The transformer of claim 1, wherein said second windings are tapped at corresponding points.

7. The transformer of claim 6, wherein each tap of the second windings is connected to a separate one of said at least three input terminals and wherein:
   said first end of said second winding of said first coil is electrically connected to the tap of said third winding of said second coil;
   said first end of said second winding of said second coil is electrically connected to the tap of said third winding of said third coil; and
   said first end of said second winding of said third coil is electrically connected to the tap of said third winding of said first coil.

8. The transformer of claim 6, wherein:
   said tap of said second winding of said first coil is electrically connected to said tap of said third winding of said second coil;
   said tap of said second winding of said second coil is electrically connected to said tap of said third winding of said third coil; and
   said tap of said second winding of said third coil is electrically connected to said tap of said third winding of said first coil.

9. The transformer of claim 8, wherein each of said first ends of said second windings is electrically connected to a separate one of said at least three input terminals.

10. The transformer of claim 1, wherein each of said first, second, and third coils contain a fourth isolated winding with a first end electrically connected to a separate one of said at least three input terminals and a second end electrically connected to the first end of corresponding ones of said second windings to form a zig-zag configuration.

11. An AC to DC converter system comprising:
an N-pulse rectifier providing a set of output terminals, where N is a multiple of 6 and at least 12, and corresponds to a number of inputs of said N-pulse rectifier;
a transformer having at least three input terminals arranged for electrical connection to an external three phase power source and at least six output terminals arranged for electrical connection to an external multiple phase load;
wherein said transformer further comprises:
a first coil, a second coil and a third coil each containing at least a first winding, a second winding and a third winding, each winding being isolated relative to each other and having a first end and a second end, wherein:
each of said third windings is tapped at corresponding points;
the first ends of the first windings are electrically connected together to form an electrical neutral;
said second winding of said first coil is electrically connected to the tap of said third winding of said second coil;
said second winding of said second coil is electrically connected to the tap of said third winding of said third coil; and
said second winding of said third coil is electrically connected to the tap of said third winding of said first coil;
the second end of said first winding of said first coil is electrically connected to said second end of said second winding of said second coil;
the second end of said first winding of said second coil is electrically connected to said second end of said second winding of said third coil;
the second end of said first winding of said third coil is electrically connected to said second end of said second winding of said first coil;
each of the three first ends of said third windings is connected to a separate one of said at least six output terminals; and
each of the three second ends of said third windings is connected to a separate one of remaining output terminals; and
wherein the N inputs of the N-pulse rectifier are indirectly connected via the transformer to receive power applied to said three input terminals.

12. The converter system of claim 11, wherein said transformer is constructed using a five legged three phase core.

13. The converter system of claim 11, wherein:
said first end of said second winding of said first coil is electrically connected to the tap of said third winding of said second coil;
said first end of said second winding of said second coil is electrically connected to the tap of said third winding of said third coil; and
said first end of said second winding of said third coil is electrically connected to the tap of said third winding of said first coil.

14. The converter system of claim 11, wherein the tap of each said third winding is electrically connected to a separate one of said at least three input terminals.

15. The converter system of claim 11, wherein said second windings are tapped at corresponding points.

16. The converter system of claim 15, wherein each tap of the second windings is connected to a separate one of said at least three input terminals and wherein:
said first end of said second winding of said first coil is electrically connected to the tap of said third winding of said second coil;
said first end of said second winding of said second coil is electrically connected to the tap of said third winding of said third coil; and
said first end of said second winding of said third coil is electrically connected to the tap of said third winding of said first coil.

17. The converter system of claim 15, wherein:
said tap of said second winding of said first coil is electrically connected to said tap of said third winding of said second coil;
said tap of said second winding of said second coil is electrically connected to said tap of said third winding of said third coil;
said tap of said second winding of said third coil is electrically connected to said tap of said third winding of said first coil; and
wherein each of said first ends of said second windings is electrically connected to a separate one of said at least three input terminals.

18. The converter system of claim 11, wherein each of said first, second, and third coils contain a fourth isolated winding with a first end electrically connected to a separate one of said at least three input terminals and a second end electrically connected to the first end of corresponding ones of said second windings.

19. The converter system of claim 11, wherein the output terminals to which the three first ends of the third windings are connected and the remaining output terminals to which the three second ends of the third windings are connected are respectively coupled to a first and second set of input terminals of the N-pulse rectifier.

20. The converter system of claim 11, wherein said first, second, and third isolated windings together make up a first set of transformer windings, said converter system further comprising:
multiple levels of transformer windings with a first level including said first set of transformer windings and a second level including a second and a third set of transformer windings;
wherein the output terminals of the first level to which the three first ends of the third windings are connected and the remaining output terminals of the first level to which the three second ends of the third windings are connected are respectively coupled to input terminals of the second and third sets of transformer windings at the second level; and
wherein the first three and second three ends of the third windings of each of the second and third sets of transformer windings are coupled to separate input terminals of a 4N-pulse rectifier.

* * * * *